Feb. 27, 1940.  F. W. BURGER  2,192,004
BRAKE
Filed Nov. 25, 1938  2 Sheets-Sheet 2
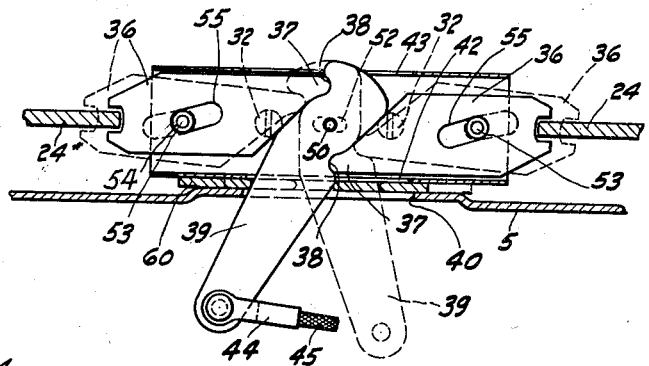
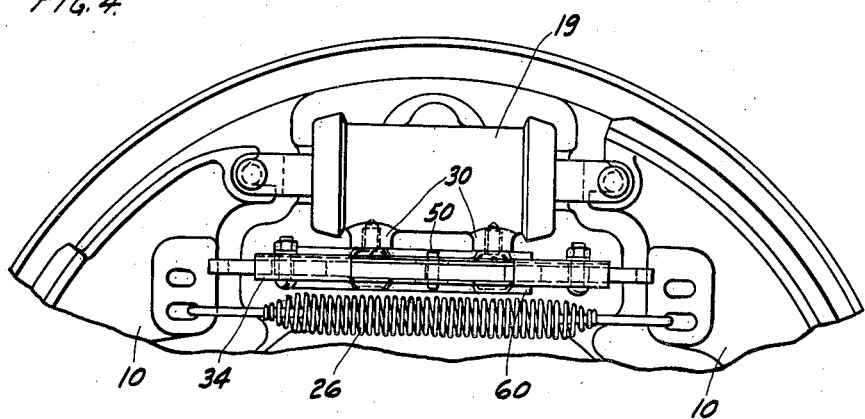
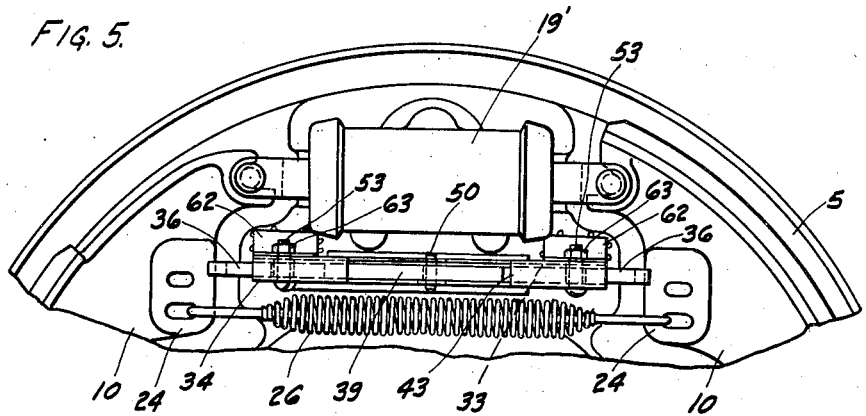
INVENTOR.
FREDERICK W. BURGER.
BY Walter E. Schirmer
ATTORNEY.

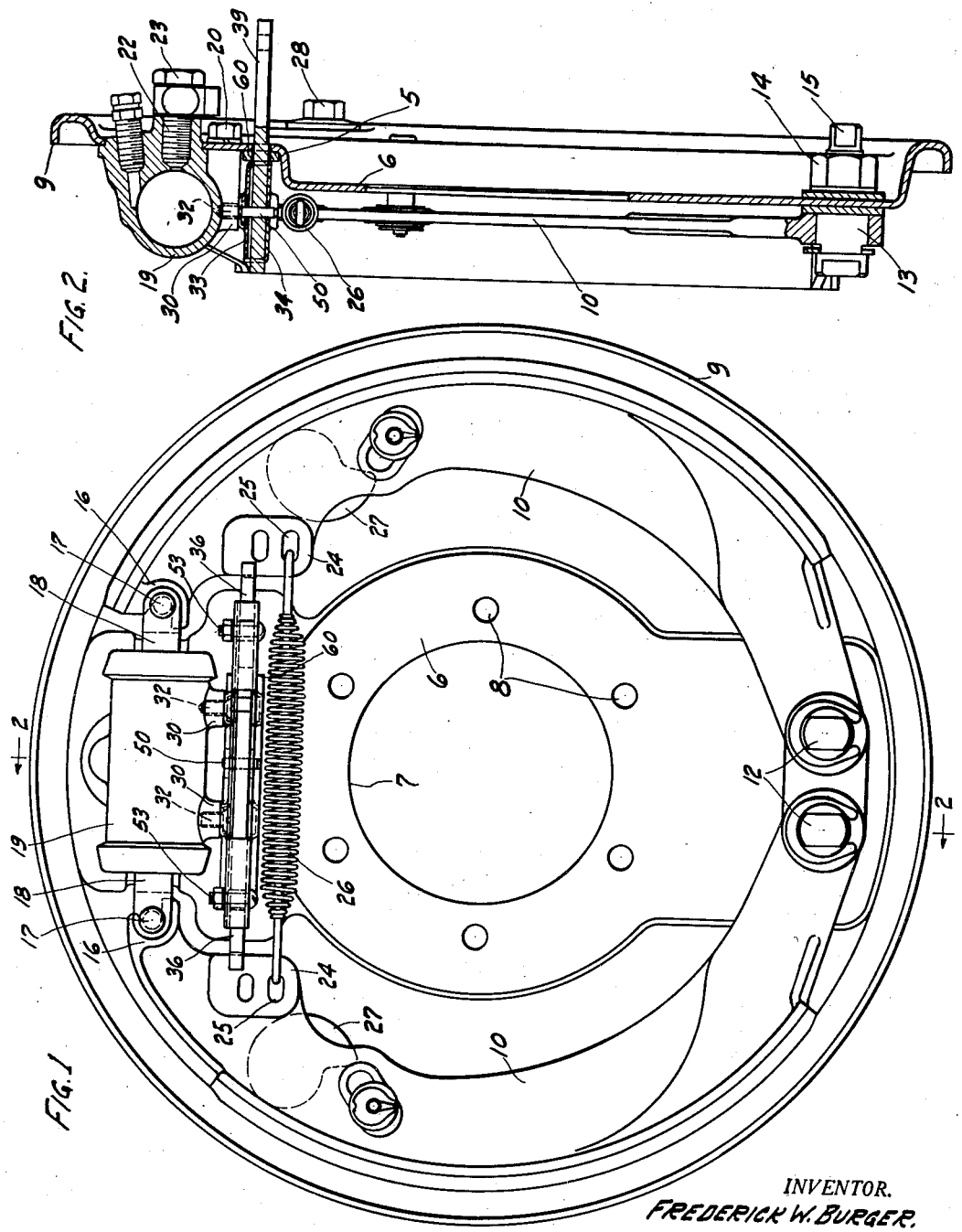

Patented Feb. 27, 1940

2,192,004

UNITED STATES PATENT OFFICE 2,192,004

BRAKE

Frederick W. Burger, Niles, Mich., assignor to Clark Equipment Company, Buchanan, Mich., a corporation of Michigan Application November 25, 1938, Serial No. 242,168

11 Claims. (Cl. 188—106)

This invention relates to brakes, and more particularly is directed to a brake actuating mechanism of the mechanical type to be used in conjunction with the conventional type of hydraulic brake assembly.

It is essential, in connection with the usual hydraulic brake assembly used for service braking, to provide some mechanical means of expanding the brake shoes against the drum, since the hydraulic brake actuator is not useable as a parking or emergency brake. Such mechanical means have taken various forms in assemblies with which I am familiar, but one of the common defects of most of such constructions is the inadequate support provided on the backing plate for holding the arms or links through which the braking force is applied against buckling or misalinement.

Still another disadvantage of previous types of such mechanisms has been the difficulty of finding sufficient space in the conventional assembly to locate supports and guides for the arms, these supports and guides being customarily secured to the backing plate.

The present invention has for one of its primary objects the provision of a mechanical brake actuating mechanism which has rigid guiding support for the movement of the pressure-applying arms, and which prevents any possibility of these arms buckling or binding in service.

Another object of the present invention is the provision of a supporting structure for the actuating mechanism which is independent of the backing plate, and is supported directly by the hydraulic cylinder. This eliminates welding, riveting or otherwise securing guide and support members to the backing plate, and eliminates any changes in the contour or shape of the plate, requiring only a slot for receiving the projecting end of the actuating lever.

Still another advantage secured by the present invention is a design of this mechanism such that the basic parts may be made from sheet metal stampings, and may be readily assembled with conventional screws and bolts. This provides a simplified economical construction that can be built at low cost.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is an elevational view of a brake assembly embodying the present invention;

Figure 2 is a sectional view thereof taken on line 2—2 of Figure 1;

Figure 3 is a plan view of the mechanical brake actuating structure;

Figure 4 is a detailed elevational view showing the brake in engaged position; and Figure 5 is a view similar to Figure 4 of a modified form of the invention.

Referring now in detail to the drawings, I have disclosed a brake plate 5 having a central offset portion 6 providing an aperture 7 adapted to fit over an axle housing arm and having the circumferential series of openings 8 for receiving the rivets by which the plate may be secured to the brake flange on the housing. The plate 5 is also provided with a peripheral flange portion 9 adapted to embrace the brake drum carried by the wheel and to enclose the lateral edge thereof.

Pivotally mounted on the plate 5 are a pair of brake shoes 10 which at one end are anchored to the plate by means of the studs 12, these studs having eccentric bearing portions 13 and projecting through the plate and secured thereto by the nuts 14. Rotation of the studs 13 by means of a suitable wrench engaging the slabbed-off end 15 of the studs will produce proper adjustment of the position of the pivoted end of the brake shoes 10. At their opposite end the shoes 10 are provided with semi-circular transverse recesses 16 adapted to receive the ends 17 of piston rods 18 carried within the hydraulic cylinder 19 which is secured in an opening in the brake flange by means of the cap screws 20. The cylinder 19, as shown more clearly in Figure 2, is provided with an inlet opening 22 having a connection 23 for the hydraulic conduit by which fluid under pressure is admitted to the interior of the cylinder to spread apart the pistons carried at the inner ends of the arms 18.

Below the recesses 16 in the brake shoes, each of the shoes is provided with a boss portion 24 having slots 25 therein providing anchor supports for the ends of a contracting spring 26 which normally tends to contract the shoes to brake releasing position. Suitable cams 27 are anchored on the backing plate 5 and are provided with stud portions 28 extending through the backing plate for adjustment of the position of the shoes relative to the drum.

The cylinder 19 is provided with two depending boss portions 30 which are suitably tapped to receive the countersunk screws 32, these screws being adapted to support an L-shaped plate 33 extending longitudinally beneath the cylinder. The plate 33 preferably is formed from a metal stamping and has the normally outstruck portions receiving the heads of the screws 32.

Cooperating with the plate 33 is a second L-shaped plate 34 which is so positioned with respect to the plate 33 as to form a substantially rectangular section guide for two longitudinally reciprocable arms 36 carried within the guide formed by the members 33 and 34, and having notched end portions adapted to engage the bosses 24 of the brake shoes 10. At their inner ends the arms 36 are provided with cam portions 37 which are adapted to engage in suitable corresponding cam surfaces 38 formed in an actuating lever 39 extending transversely through the slot 40 in the backing plate 5 and through corresponding slots 42 and 43 in the members 33 and 34, respectively. This actuating lever at its outer end is adapted to carry a clevis 44 to which is secured the cable 45 or similar actuating mechanism leading to a hand brake lever or the like. The lever 39 is adapted to be mounted for rotation about a pivot pin 50, carried thereby, which pin is guided within longitudinal slots 52 formed in the upper and lower surfaces of the guide comprising the members 33 and 34. This allows for floating movement of the pivot to produce an equalizing brake applying pressure on each of the arms 36 upon rotation of the lever 39. The arms 36 are mounted for movement on suitable pins 53 carrying guide sleeves 54 thereon and extending through slots 55 formed in the arms. This allows slight cocking of the arms within the guide during actuation thereof, but retains the arms against displacement out of the guides and prevents rattling of the arms therein. The pins 53 preferably comprise bolts which are secured between the upper and lower portions of the members 33 and 34 to hold these two L-shaped members together, and the sleeves mounted on the pin 53 serve as spacing members for preventing any binding of the arms 36 within the guide.

It will thus be apparent that the entire brake actuating mechanism, including the actuating lever 39, the two arms 36 and the guide 33—34 are suspended from the hydraulic cylinder 19 by means of the screws 32, and are entirely independent of any other support on the backing plate. This provides a very desired type of construction since it eliminates the necessity of spot welding or otherwise securing guides or supports to the backing plate, and also insures that the mechanism can be supported in the structure regardless of the particular shape or configuration of the backing plate. In addition, the hydraulic cylinders can be formed with the boss portions 30 regardless of whether or not the mechanical brake mechanism is to be applied, thus making them adapted for use with or without such a mechanical brake applying system. Preferably, a suitable sealing leather or gasket 60 is carried on the lever 39 intermediate the flange of the member 33 and the slot 40 in the backing plate 5. This leather closely fits about the lever 39 and insures that the slot 40 will be sealed against the entrance of dirt or moisture in the use of the brake mechanism. The leather 60 moves longitudinally upon rotation of the lever 39, thus at all times closing the slot 40 about the lever.

In Figure 4 the mechanism is shown in brake expanded position wherein the hydraulic brake has been operated to expand the shoes in which event the mechanical brake system remains in inoperative position, the boss portions 24 of the shoes moving slightly outwardly with respect to the notches in the ends of the arms 36. It is apparent that either of the braking systems can be operated to expand the shoes independently of the other, and that the mechanical brake applying means in no way interferes with the hydraulic brake application. The dotted line position of the arm 39, as shown in Figure 3, illustrates the possible amount of take-up which may be had in the mechanical brake system as the lining of the brake shoes wears. Actually, the rotation of the arm 39 for any particular brake application is only a few degrees, but as the brake lining wears, the arm is progressively moved from the full line position to the dotted line position of Figure 3 to accommodate this wear.

The use of the slots 55 is necessary in order to allow the arms to follow in engagement with the bosses 24 upon the movement of the lever 39, since the cam portions 38 and 37 will produce a slight cocking of the arms in the rotation of the lever 39.

In Figure 5 I have shown a modified form of construction in which the hydraulic cylinder 19' is not provided with the boss portions 30 for supporting the mechanical brake mechanism, but this mechanism is supported by means of L-shaped brackets 62 spot welded or otherwise secured to the backing plate 5 and having normally extending flange portions engaged under the nuts 63 of the pins 53. This serves to support the mechanism in substantially the same manner as previously described inasmuch as the members 33 and 34 are thereby held in proper position for supporting the arms 36 and the actuating lever 39 which projects outwardly through the backing plate and has its inner end moving in the slotted out portion 43 of the member 34. This is merely a modification of the support on the hydraulic cylinder for use in cases where a particular cylinder is employed that does not have the tapped bosses 30 to adapt the present actuating mechanism to structures now in use.

The operation of the mechanism shown in Figure 5, insofar as brake applying and releasing is concerned, is identical with that previously described, and it is therefore not believed necessary to give a detailed description thereof.

It will be apparent that all of the parts of the mechanism may be formed of metal stampings or the like, which render them very economical in mass production and also facilitate the assembly of the parts at low cost. Further, the design is simple and may be adjusted for wear without any difficulty.

I am aware that slight changes may be made in certain details of the present construction without, however, departing from the underlying principles thereof, and I therefore do not intend to be limited except as defined by the scope and spirit of the appended claims.

I claim:

1. In combination, a hydraulic brake actuating cylinder, a pair of angle plates arranged to form a box-section support extending longitudinally beneath said cylinder, means securing said plates against relative movement, brake-shoe-engaging arms reciprocably mounted in said support, and means for securing the upper plate of said support to said cylinder.

2. In combination, a hydraulic brake actuating cylinder, a pair of brake shoe engaging arms, a support enclosing the major portion of said arms extending longitudinally beneath said cylinder, and means securing said support to said cylinder.

3. In combination, a backing plate, a pair of brake shoes pivotally mounted thereon, a box-section open-ended guide secured intermediate said shoes, a pair of oppositely extending arms guided for reciprocable movement therein and adapted to have limited transverse rocking movement, an actuating lever extending laterally into said guide and pivoted intermediate the ends of the arms, said lever having cam portions engaging said arm ends for moving the arms in opposite directions and transversely rocking the same upon rotation of the lever to move said shoes apart, and spring means normally tending to contract said shoes.

4. A brake assembly comprising a backing plate, a pair of brake shoes pivotally mounted thereon, a hydraulic cylinder mounted on said plate intermediate said shoes, a pair of coplanar arms engaging said shoes and having their adjacent ends formed with diagonal cam surfaces, an actuating lever for spreading said arms apart pivoted intermediate said arm ends and having cooperating cam surfaces terminating in stop portions for limiting rotation of said lever, and means for guiding and supporting said arms and lever secured to said cylinder.

5. A brake assembly comprising a backing plate, a pair of brake shoes pivotally mounted thereon, and mechanical brake actuating means comprising a pair of oppositely extending arms engaging said shoes, a lever pivotally mounted intermediate said arms and having camming engagement with the adjacent ends thereof, and a box-like housing supporting said lever and arms and having means providing limited lateral rocking of said arms and guiding said arms for longitudinal movement.

6. In combination, a mechanical brake actuating mechanism for a conventional hydraulic brake assembly including a pair of pivotally mounted brake shoes, comprising a pair of L-shaped plates arranged to form a rectangular section, hollow guide means intermediate said shoes, an arm extending from each end thereof engageable with the adjacent shoe, a lever projecting laterally of said guide means and having pivotal support thereon, and interengaging cam means on the lever and the adjacent ends of said arms whereby rotation of said lever tends to move said arms outwardly of said guide means, said cam means including stop means limiting rotation of said lever in brake applying direction.

7. In combination, a mechanical brake actuating mechanism for a conventional hydraulic brake assembly including a pair of pivotally mounted brake shoes, comprising hollow guide means intermediate said shoes, an arm extending from each end thereof engageable with the adjacent shoe means in said guide means preventing binding of said arms therein, a lever projecting laterally of said guide means and having pivotal support thereon, and interengaging cam means on the lever and the adjacent ends of said arms whereby rotation of said lever tends to move said arms outwardly of said guide means.

8. In combination with a hydraulic brake assembly including a pair of brake shoes and an actuating cylinder, a mechanical brake applying mechanism comprising a housing extending between said shoes and of rectangular section, a pair of arms having opposite ends engaging said shoes, means intermediate the ends of said arms limiting their movement relative to said housing, an actuating lever extending laterally into said housing between the adjacent ends of said arms and having cam means for moving said adjacent ends of said arms apart upon rotation of said lever.

9. The combination of claim 8 wherein the opposite side walls of said housing are cut away to accommodate movement of said lever.

10. The combination of claim 8 wherein said housing comprises two opposite arranged L-shaped plates, and means for securing the upper plate to the bottom of said cylinder.

11. A brake assembly comprising a backing plate, a pair of brake shoes pivotally mounted thereon, a housing extending transversely between said shoes and fixed relative to said plate, a pair of arms extending outwardly from opposite ends of said housing and engaging said shoes, a diagonal slot in each arm intermediate the ends thereof, pin means adjacent each end of said housing engaging in said slots for limiting movement of said arms, an actuating member pivoted in said housing intermediate said arms, and cam means on said member engaging adjacent arm ends.

FREDERICK W. BURGER.